US008111581B1

(12) United States Patent
Donaldson et al.

(10) Patent No.: US 8,111,581 B1
(45) Date of Patent: Feb. 7, 2012

(54) MONITORING SYSTEM FOR A SHIP'S RADIATED NOISE

(75) Inventors: John Marshall Donaldson, Fife (GB); Stuart Lawson Millar, Aberdeenshire (GB); George Alexander Duncan, Fife (GB); Martin John Moody, Fife (GB)

(73) Assignee: QinetiQ Limited, London (GB)

( * ) Notice: Subject to any disclaimer, the term of this patent is extended or adjusted under 35 U.S.C. 154(b) by 0 days.

(21) Appl. No.: 06/901,072

(22) Filed: Aug. 11, 1986

(30) Foreign Application Priority Data

Aug. 9, 1985 (GB) .................................... 8520086

(51) Int. Cl.
*H04B 17/00* (2006.01)
(52) U.S. Cl. ........................................................ 367/13
(58) Field of Classification Search .............. 367/1, 901, 367/124, 126; 381/174
See application file for complete search history.

(56) References Cited

U.S. PATENT DOCUMENTS 4,025,724 A * 5/1977 Davidson, Jr. et al. ........... 367/1
4,594,695 A * 6/1986 Garconnat et al. ............ 367/901

* cited by examiner

*Primary Examiner* — Daniel Pihulic
(74) *Attorney, Agent, or Firm* — Nixon & Vanderhye P.C.

(57) ABSTRACT

A ship's radiated noise monitoring system includes a plurality of arrays of spaced vibration-responsive detectors, the arrays being adapted for location adjacent to the ship's hull in the region of possible noise sources; summing amplifiers for receiving the detectors output signals from respective arrays and providing output signals representative of the average vibration signals received by each array; an analyzer connected to the output of each summing amplifier to perform a spectrum analysis; and computer apparatus to receive the noise spectrum from each array, apply respective weighting factors to the noise spectra and combine the weighted noise spectra to produce a predicted radiated noise spectrum. Preferably each array comprises a regular distritution of nine accelerometers attached to hull frames in groups of three. The system is used in conjunction with sonar equipment to enable self-noise to be monitored to optimise the sonar performance.

19 Claims, 3 Drawing Sheets

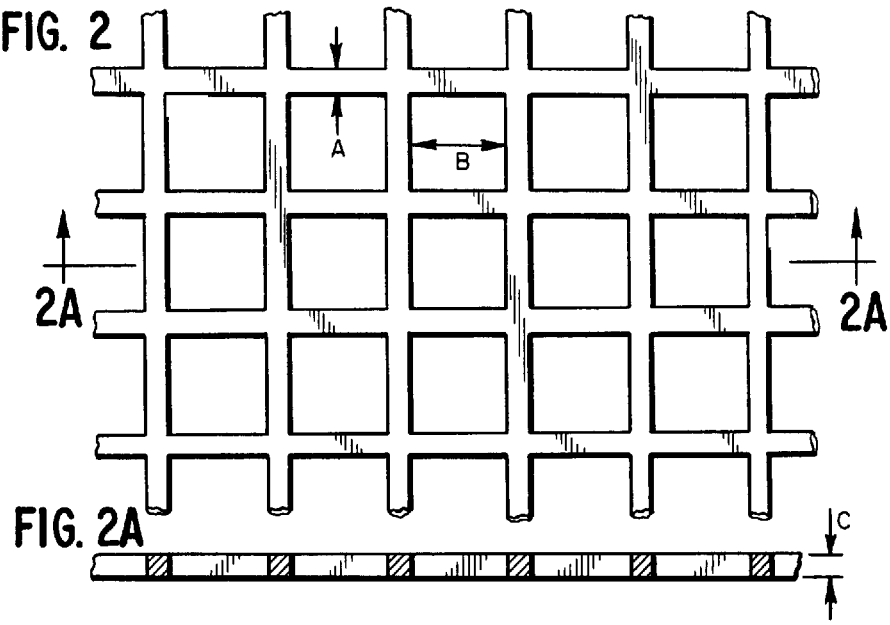
FIG. 2
FIG. 2A
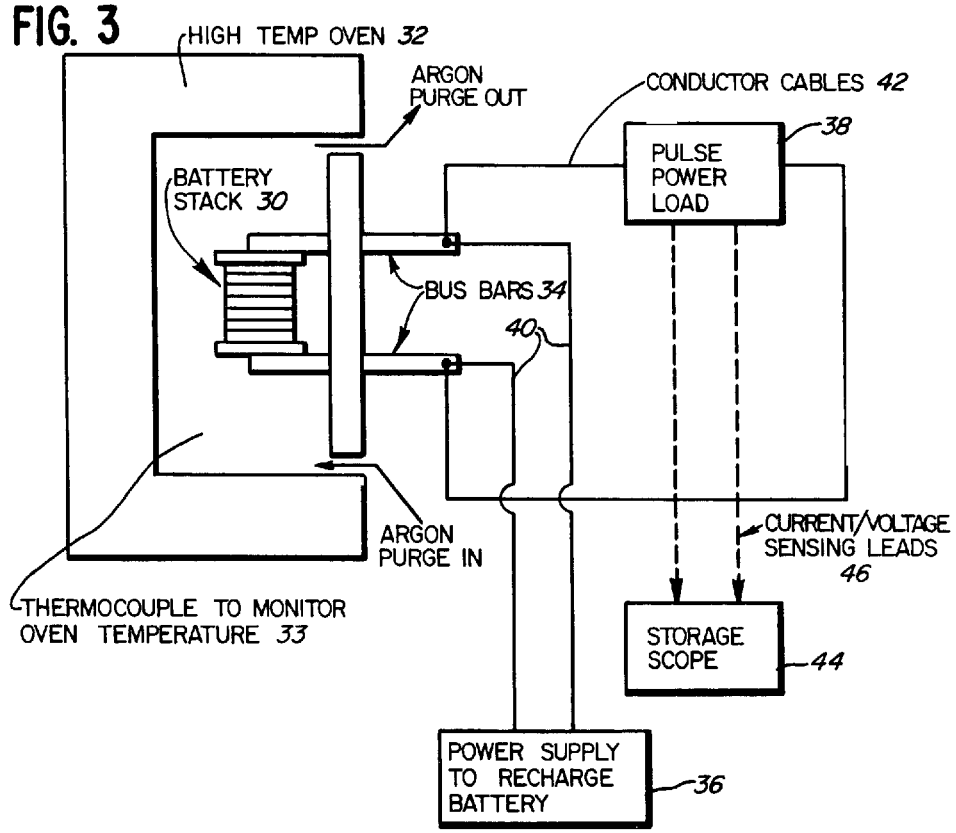
FIG. 3

MONITORING SYSTEM FOR A SHIP'S RADIATED NOISE

The invention relates to the measurement of radiated under-water noise by ships and in particular to equipment capable of measuring locally produced vibration to enable the frequency spectrum of radiated noise to be predicted.

There are many sources of noise on board a ship, each contributing in a complex frequency-dependent way to the spectrum of noise radiated from the ship. The list of machinery contributing to the underwater noise signature includes: propulsion machinery, auxiliary services such as high pressure air, hydraulic, sea and fresh water systems, ventilation and refrigeration plant, conversion machinery, weapon and sonar chilled water pumps etc. In addition there are contributions to the radiated noise from propeller noise/cavitation.

Measurements of radiated noise can be obtained using noise range measurements from seabed sensor arrays: the results being dependent upon ship's speed, the state of each on-board noise source, and the position of the ship relative to the static noise range transducers.

The object of the present invention is to provide a noise monitoring system which relies upon on-board measurements to predict the underwater noise spectrum radiated by a ship.

The invention provides a ship's radiated noise monitoring system comprising a plurality of arrays of spaced vibration-responsive detectors, the arrays being adapted for location adjacent to the ship's hull in the region of possible noise sources; summing amplifiers for receiving the detector output signals from respective arrays and providing output signals representative of the average vibration signals received by each array; means connected to the output of each summing amplifier to perform a spectrum analysis; and computer means to receive the noise spectrum from each array, apply respective weighting factors to the noise spectra and combine the weighted noise spectra to produce a predicted radiated noise spectrum.

Preferably each array comprises a regular distribution of nine accelerometers attached to hull frames in groups of three. The provision of arrays of spaced vibration detectors minimises the effect of local point vibration which would reduce the accuracy of the overall predicted radiation noise spectrum. (Advantageously the array spectrum analysis means is a Fast Fourier Transform (FFT) analyser.) Conveniently a spectral analysis is performed at third octave intervals. The maximum level within each third octave interval from the plurality of arrays is then modified by a weighting factor to provide the prediction spectrum.

Advantageously for each possible noise source, two detector arrays are symmetrically placed, one to the starboard and one to the port side of the hull.

It has been found preferable to calibrate the system by comparison with conventional noise range measurements. Once the system has been calibrated for one ship's speed the predicted radiated noise has been found to be in good agreement with measured radiated noise for machinery-dominated noise speeds.

For installation in submarines additional arrays of hydrophones may be installed in free-flood spaces outside the pressure hull of the submarine so as to allow the additional estimation of flow induced noise. Advantageously each additional array comprises four hydrophones connected to a summation amplifier.

For installation in surface ships an additional array of two transducers may be fitted as a propeller noise/cavitation monitor.

The invention will now be described by way of example only with reference 8 the accompanying drawings of which:

FIG. 2 illustrates the siting of two similar arrays about a potential source of noise on a ship;

FIG. 3 is schematic block diagram of the radiated noise monitoring system; and

Figure 1:
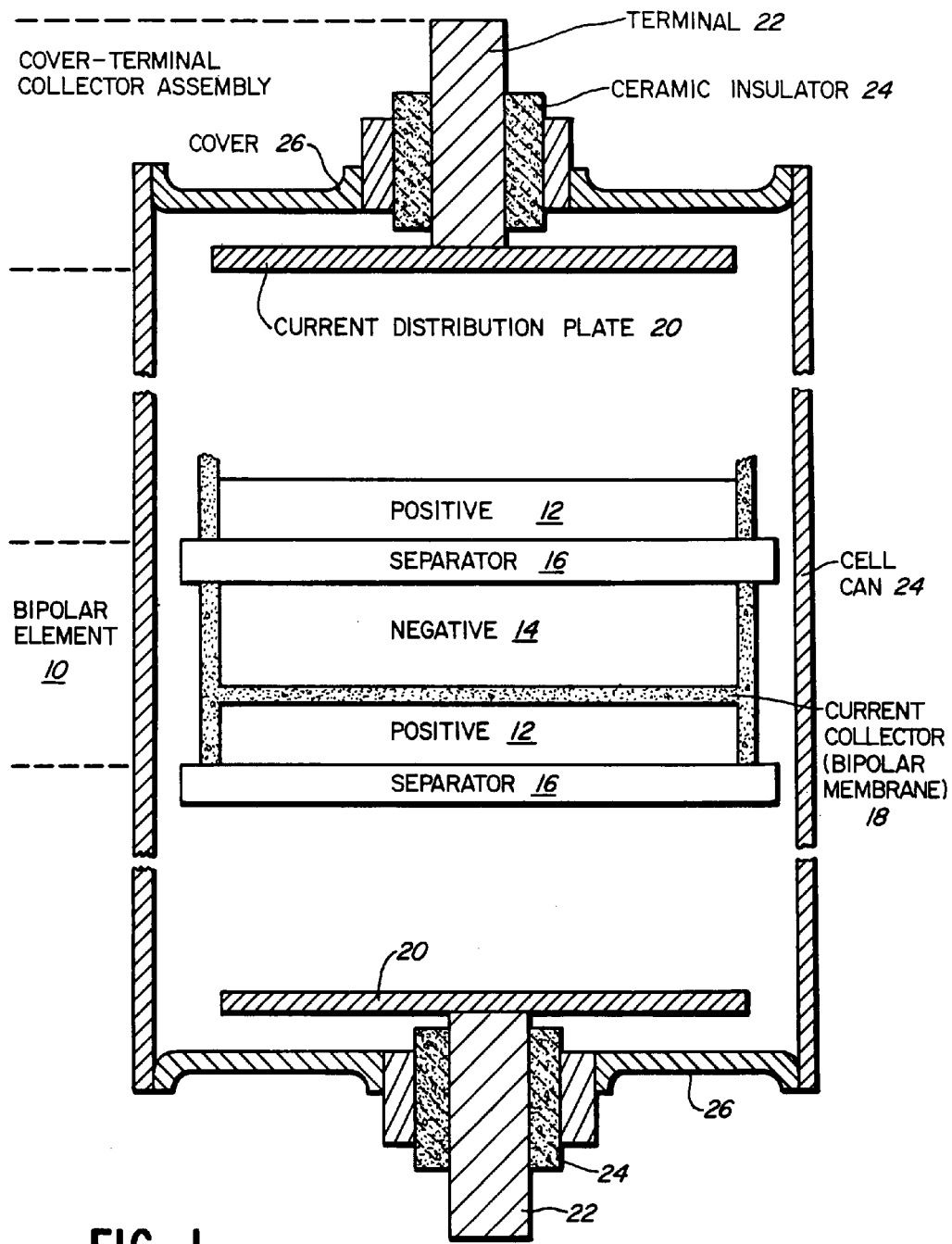
FIG. 1 shows an array of accelerometers for use in a radiated noise monitoring system.

FIG. 1 shows a regular 3×3 array 10 of piezo accelerometer transducers 11 attached to supporting frames 12. In a ship's radiated noise monitoring system a number of these arrays are attached to the ship's hull so as to give an overall measure of machinery-stimulated hull vibrations. Such measured vibrations can then be used to predict the spectrum of noise radiated from the ship as will be described below.

FIG. 2 illustrates the siting of the accelerometer arrays. Components 21 defined by the ship's hull 22 and bulkheads 23 which include potential noise sources 20 are identified. Such potential sources 20 include propulsion machinery, auxiliary services such as high pressure air, hydraulic, sea and fresh water systems, ventilation and refrigeration plant, conversion machinery, weapon and sonar chilled water pumps etc. Each identified compartment 21 is fitted with symmetrical arrays 10a and 10b on the starboard and port hull sides. Ideally the accelerometers 11 should be arranged on a regular 3×3 rectangular grid with spacings $S, S_f$ as shown in FIG. 1. The forward three accelerometers 11 are mounted on a single frame 12a one or two frame spaces $S_f$ aft of the forward bulkhead 23a. The aft three accelerometers 11 are similarly mounted on a single frame 12c one or two frame spaces $S_f$ forward of the aft bulkhead 23b. The centre group of three accelerometers 11 are mounted on single frames 12b midway between the forward and aft groups of accelerometers. The maximum spacing S between the groups of accelerometers should not exceed $5 \times S_f$ and the complete array 10 should cover at least 60% to 70% of the compartment length. Where long compartments are encountered the array may be shortened and moved towards one end of the compartment or the other so long as no major items of machinery are significantly outside the space encompassed by the boundaries of the starboard and port arrays. Where an adjacent compartment also includes measurement arrays, placement of an array too near the common bulkhead will result in that array responding in some measure to vibrations from the adjacent compartment. In this circumstance the array should not be placed too close to the common bulkhead. In some exceptionally long compartments, where the above 60% & 70% compartment coverage is not met, it may be necessary to fit more than two arrays. Practical considerations may not always permit each group of three accelerometers to be fitted to the same frame. The groups may then be attached to the hull by two or three frames as necessary.

When used on submarine pressure hulls, the angular separation between the upper and lower accelerometers 11 on a given frame 12, ie the angle subtended by a frame of length $2S_f$ at the longitudinal axis of the pressure hull, should be about 60°. The upper accelerometer may then be positioned between 10° and 35° above the horizontal. In submariners' forward compartments it is difficult to achieve a regular array and compromise may be required. The predominant rule for submarines is that the space enclosed between starboard and port arrays should enclose all major items of machinery, even at the expense of breaking other previously stated rules.

For surface ships use, difficulties are created by the number of fuel, lubrication oil and water tanks which limit access to the hull in many compartments. Where possible, regular 3×3 arrays are used as described above with the upper transducers 15° to 30° below the waterline and with the middle and lower transducers at respective iangular separations of about 30° below. Where tanks are present, however, rearrangement of an array may be necessary. One possibility, for example, where a tank is present would be to use a 4×2 array with a line of four accelerometers positioned 15° to 30° below the water line and the second line of four accelerometers below them and immediately above the tank.

It is important that an array's position should not be specifically set so as to place accelerometers close to particular machines since this will result in an artifically weighted array output. Where areas of a ship's hull have been treated with acoustic decoupling coatings each accelerometer in an array must be adjacent to a like-treated portion of the hull. Thus some accelerometers should not be attached to untreated areas of the hull while other accelerometers of the same array are attached to treated areas.

FIG. 3 illustrates the complete noise monitoring system. A total of sixteen arrays is available 31, 32, 33 ... 34. The output from each accelerometer transducer 35 in an array 31 (say) is connected to a respective summation amplifier 36, 37, 38 ... 39. The arrays are divided into two groups of eight with each group being controlled by a respective switching unit 310, 311. The switching units 310, 311 are AC powered (312, 313) and are able to select individual summation amplifiers as they are addressed via an IEEE Interface Unit 34 and connect the selected amplifier's analogue output signal to a Fast Fourier Transform Analyser 315. Results obtained from the analyser 315 are displayed, together with the predicted radiated noise spectrum on a video monitor of a computer 316. In some installations audio monitors 317, 318 may be required as shown. Suitable audio signals are obtained from the interface unit 34 via line isolating matching transformers (not shown) to reduce the possibility of ground loops occurring.

In the case of surface ships a cavitation monitor system may be included. The cavitation array 34 comprises accelerometer transducers 3, 9, 320 positioned on the hull immediately above each propeller. The summation amplifier 39, identical to the other nine-input amplifiers 36-38, is modified for the appropriate number of signal inputs (two as shown). The output from this amplifier 39 can be addressed via the switching unit 311 to provide an input to the noise monitoring scan and/or it can be hard-wired to the audio monitors 317, 318 sited at the bridge and ops room. Computer generated addresses which are used for the switching units 310, 311 to select individual arrays can also be arranged to select individual transducer outputs so that, for example the noise generated by two propellers can be monitored in turn.

The summation amplifier 36 is shown with an additional input 321 from a portable transducer 322. This is provided for health monitoring of individual machinery components within the compartment. The hand-held unit 323 comprises a charge-current pre-amplifier with switchable sensitivity. The transducer probe 322 may include a magnetic base for attachment to machinery as required with a length of cable 324 linking it to the hand unit 323. Alternatively the transducer probe 322 may be hand-held.

The accelerometers are arranged such that the sensing piezo transducer together with a pre-amplifier are housed in an electrically isolated, corrosion resistant and hermetically sealed package. Array signals from the summation amplifiers are routed as a balanced two-wire signal at a high voltage/low impedance level to the interface unit 314. The interface unit 314 incorporates a differential input amplifier with unity gain (not shown) to convert the signal to a single-ended output suitable for connection to the analyser 315, or to test equipment 317, 318.

For use in submarines one or more accelerometer arrays may be replaced by hydrophone arrays to monitor hydrodynamically generated noise. The nine accelerometers of an array are replaced by a four-hydrophone array. Generally three such arrays are used in noise making areas: forward and aft free flood spaces or main ballast tanks and the fin. The outputs from the four hydrophones of an array are connected to a summation amplifier suitably modified for only four inputs, effectively "shorting" unused inputs. Each hydrophone has an omnidirectional sensing element with an integral charge-to-current converter included in a water-tight package. The fore and aft arrays should be positioned at a location approximately midway between the pressure hull dome and the end of the vessel. The hydrophones should be spaced about 45° above and below the hull centre line. The hydrophones of the fin array should be positioned on the centre line in positions corresponding to the forward upper and lower corners and the aft upper and lower corners.

Figure 4:
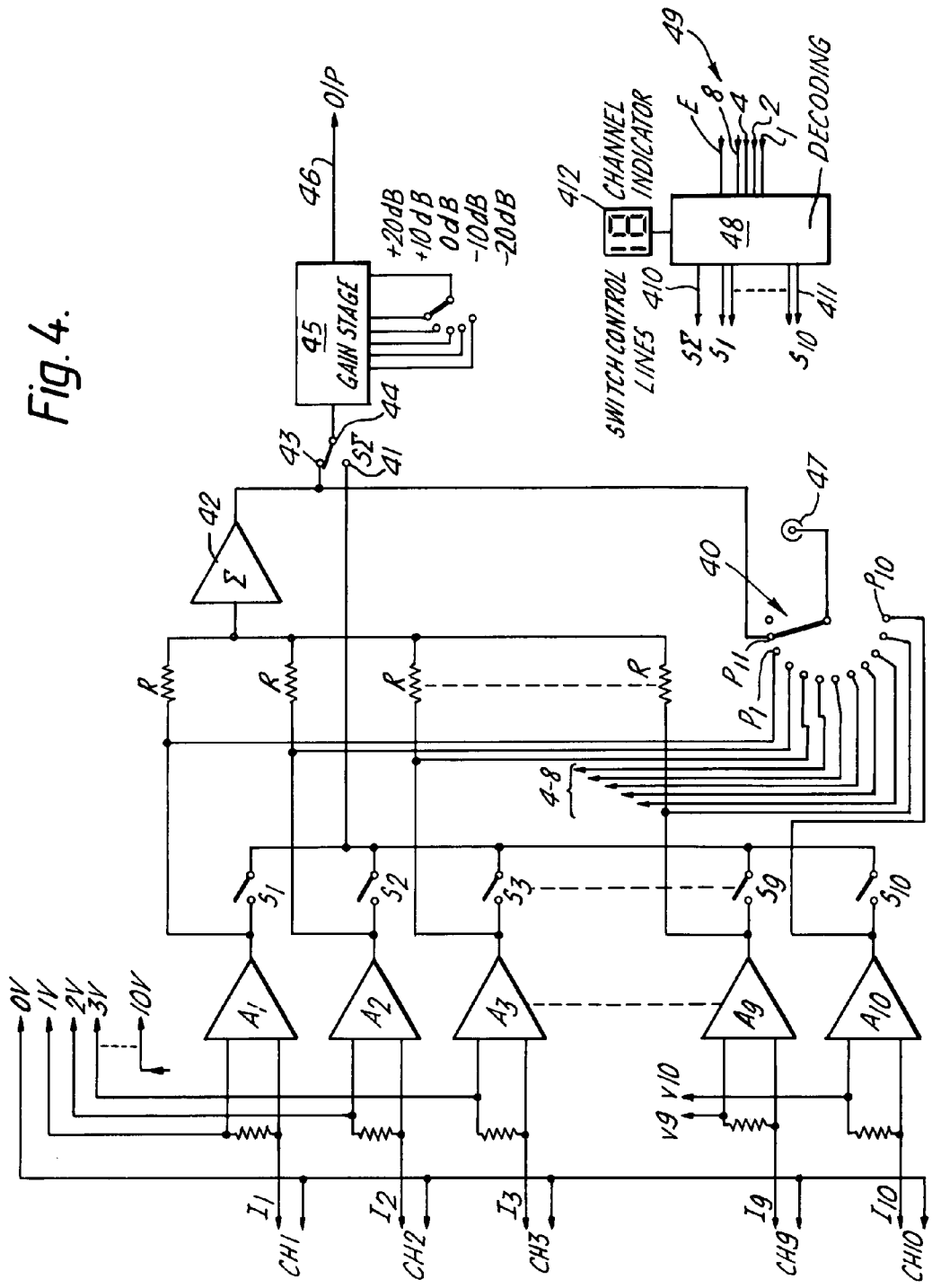
FIG. 4 is a circuit diagram of a summation amplifier used in the FIG. 3 system.

FIG. 4 shows a circuit diagram of a summation amplifier (36-39) which includes 10 inputs $I_1$-$I_{10}$. The inputs are connected to input amplifiers $A_1$-$A_{10}$. The respective outputs from the amplifiers $A_1$-$A_{10}$ have three output connections:
a. to ten poles $P_1$-$P_{10}$ of a 12-pole manual switch 40;
b. via electronically operable switches $S_1$ to $S_{10}$ to a pole 41 on a further electronically operable switch $S_2$;
c. via resistors R to the input of a summing amplifier 42 whose output is connected to a second selectable pole 43 on the switch $S_2$.

The pole 44 of the switch S carries either an analogue signal representing the sum of all the transducer outputs when the switch is as shown, or the signal from one of the transducers in dependence on which of the Switches $S_1$-$S_{10}$ is energised. The switch $S_2$ is connected via a manually adjustable gain stage 45 to the summation amplifier output 46. The output from the summing amplifier 42 is also connected to pole $P_{11}$ of the manual 12—pole switch 40. An input socket 47 is connected to the switch 40 such that during testing input signals can be monitored from the array sum signal or individual transducer signals.

The switches $S_1$-$S_{10}$ and $S_2$ are computer controller via the IEEE interface unit 314 and appropriate switching unit 310 or 311. The summation amplifier includes a decoder 48 which converts the coded input switching signal 49 to a Signal on an appropriate line 410-411 to energise the switches $S_2$-$S_{10}$ as shown. A digital display 412 is also provided to display the selected switch channel.

The signal analyser 315 is a two-channel Scientific Atlanta SD375 FFT analyser which performs a ⅓ octave analysis on the signal and then sends the result to the computer 316. This analysis is done for each section or compartment of the vessels in which there are arrays. To perform a noise scan, and hence produce a ⅓ octave spectrum prediction of the radiated under-water noise, the computer aquired the ⅓ octave spectrum from each summation amplifier 36-39 in turn. The maximum signal level measured in each ⅓ octave interval over all the arrays is then taken to construct the predicted spectrum. The radiated noise spectrum is then calibrated by comparison of simultaneous measurement of the on-board noise monitoring system with the noise measured externally as the vessel passes over a noise measurement range. Once the noise monitoring system has been calibrated for one speed and machinery condition it has been found that good agreement is achieved between the prediction system and the range measurements for all speeds up to a certain speed. This certain speed depends upon the speed at which the radiated noise from the vessel ceases to be machinery dominated and starts to be hydrodynamically dominated. For submarine use, the noise monitoring system speed range has been extended by also observing hydrodynamically generated noise by the inclusion of hydrophone arrays as previously mentioned. In addition the signals measured by the cavitation transducers 319 and 320 are also incorporated into the noise spectrum prediction. During calibration the gain of each summation amplifier can be altered in steps −20 dB, −10 dB, odB, +10 dB, +20 dB by means of the manual switch on the gain stage 45. Once this is calibrated there is no further adjustment and the computer program takes these settings into account.

The computer is programmed such that the monitor displays the ⅓ octave scans from individual arrays and then displays the total scan. Current scans can then be compared with the previous scans. For the submarine case, hydrophone and accelerometer scans can be separated either graphically or numerically. To help locate an area of increased noise the operator can examine the data from individual arrays either numerically or graphically. In addition to the above features a narrow band scanning facility is included. The operator has the choice of five frequency limits: 100 Hz; 500 Hz; 1000 Hz; 5000 Hz and 10000 Hz. In this mode the scan is performed as a true averaged peak hold spectrum, although the results are then subsequently weighted by the ⅓ octave calibration factors. Various other computer facilities may be provided to improve the diagnostic capability of the system and to facilitate operator control.

The invention claimed is:

1. A ship's radiated noise monitoring system comprising: a plurality of arrays of spaced vibration-responsive detectors, each array comprising a regular two-dimensional distribution of detectors adapted for location adjacent to the ship's hull in the region of possible noise sources; summing amplifiers for receiving the detectors' output signals from each array and providing an output signal representative of an average vibration signal received by the array; means connected to the output of each summing amplifier to perform a noise spectrum analysis on each array average signal; and computer means to receive the noise spectrum from each array, apply respective weighting factors to the noise spectra and combine the weighted noise spectra to produce a predicted radiated noise spectrum.

2. A ship's radiated noise monitoring system as claimed in claim 1 wherein each array comprises nine accelerometers attached to hull frames in groups of three.

3. A ship's radiated noise monitoring system as claimed in claim 2 wherein the array spectrum analysis means is a Fast Fourier Transform (FFT) analyser.

4. A ship's radiated noise monitoring system as claimed in claim 3 wherein a spectral analysis is performed at third octave intervals.

5. A ship's radiated noise monitoring system as claimed in claim 4 wherein the maximum level within each third octave interval from the plurality of arrays is modified by a weighting factor to provide the prediction spectrum.

6. A ship's radiated noise monitoring system as claimed in claim 5 wherein for each possible noise source, two detector arrays are symmetrically placed, one to the starboard and one to the port side of the hull.

7. A ship's radiated noise monitoring system as claimed in claim 6 system wherein additional arrays of hydrophones are installed outside the ship so as to allow the additional estimation of flow induced noise.

8. A ship's radiated noise monitoring system as claimed in claim 7 wherein each additional array comprises four hydrophones connected to a summation amplifier.

9. A ship's radiated noise monitoring system as claimed in claim 8 wherein an additional array of at least two transducers are fitted as a propeller noise/cavitation monitor.

10. A ship's radiated noise monitoring system as claimed in claim 1 wherein the array spectrum analysis means is a Fast Fourier Transform (FFT) analyser.

11. A ship's radiated noise monitoring system as claimed in claim 10 wherein a spectral analysis is performed at third octave intervals.

12. A ship's radiated noise monitoring system as claimed in claim 11 wherein the maximum level within each third octave interval from the plurality of arrays is modified by a weighting factor to provide the prediction spectrum.

13. A ship's radiated noise monitoring system as claimed in claim 12 wherein for each possible noise source, two detector arrays are symmetrically placed, one to the starboard and one to the port side of the hull.

14. A ship's radiated noise monitoring system as claimed in claim 13 wherein an additional array of at least two transducers are fitted as a propeller noise/cavitation monitor.

15. A ship's radiated noise monitoring system as claimed in claim 1 wherein for each possible noise source, two detector arrays are symmetrically placed, one to the starboard and one to the port side of the hull.

16. A ship's radiated noise monitoring system as claimed in claim 15 wherein the array spectrum analysis means is a Fast Fourier Transform (FFT) analyser.

17. A ship's radiated noise monitoring system as claimed in claim 16 wherein a spectral analysis is performed at third octave intervals.

18. A ship's radiated noise monitoring system as claimed in claim 17 wherein the maximum level within each third octave interval from the plurality of arrays is modified by a weighting factor to provide the prediction spectrum.

19. A ship's radiated noise monitoring system as claimed in claim 15 wherein an additional array of at least two transducers are fitted as a propeller noise/cavitation monitor.

* * * * *